(12) United States Patent
Kim

(10) Patent No.: US 7,969,831 B2
(45) Date of Patent: Jun. 28, 2011

(54) METHOD OF CONTROLLING SERVO IN OPTICAL DISC DEVICE AND SERVO CONTROL DEVICE USING THE SAME

(75) Inventor: Soo-yong Kim, Pohang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 285 days.

(21) Appl. No.: 12/205,335

(22) Filed: Sep. 5, 2008

(65) Prior Publication Data

US 2009/0059743 A1 Mar. 5, 2009

(30) Foreign Application Priority Data

Sep. 5, 2007 (KR) .................. 10-2007-0089951

(51) Int. Cl.
*G11B 7/00* (2006.01)
(52) U.S. Cl. .................. 369/44.27; 369/44.34
(58) Field of Classification Search .............. 369/44.27, 369/44.25, 44.29, 44.35, 44.26, 44.34; 347/224, 347/225, 248, 256, 262
See application file for complete search history.

(56) References Cited

U.S. PATENT DOCUMENTS

| | | | | |
|---|---|---|---|---|
| 7,015,939 B2 * | 3/2006 | Honda et al. | ................. | 347/225 |
| 2004/0136279 A1 * | 7/2004 | Koll et al. | ................. | 369/44.32 |
| 2004/0224041 A1 * | 11/2004 | Morishima | ................. | 425/73 |
| 2005/0058030 A1 | 3/2005 | Hanks et al. | | |
| 2005/0265208 A1 * | 12/2005 | Nakane et al. | ............ | 369/44.25 |
| 2006/0066714 A1 * | 3/2006 | Hayashi | ................. | 347/262 |
| 2007/0201326 A1 * | 8/2007 | Wei et al. | ................. | 369/44.29 |
| 2009/0022026 A1 * | 1/2009 | Huang et al. | ............... | 369/53.31 |
| 2009/0022033 A1 * | 1/2009 | Raaymakers | ........... | 369/112.01 |
| 2009/0040895 A1 * | 2/2009 | Raaymakers et al. | ..... | 369/53.28 |

FOREIGN PATENT DOCUMENTS

| | | |
|---|---|---|
| JP | 2006-019017 | 1/2006 |
| KR | 1020060102184 A | 9/2006 |
| KR | 1020070053294 A | 5/2007 |

* cited by examiner

*Primary Examiner* — Thang V Tran
(74) *Attorney, Agent, or Firm* — F. Chau & Associates, LLC

(57) ABSTRACT

A method of controlling a servo in an optical disc device and a servo control device using the method, in which the servo control device controls a servo for printing on a label surface of an optical disc and includes an optical pickup unit, an error signal generation unit, and a control unit. The optical pickup unit outputs a plurality of signals corresponding to a position of an object lens in response to light reflected from the label surface. The error signal generation unit outputs an error signal by selecting or combining one or more of the plurality of signals. The control unit adjusts the position of the object lens in response to the error signal. Therefore, because the position of the object lens can be adjusted with an increased range, the spot size of a beam condensed by the object lens can be adjusted within an increased range, and a data recording time can be reduced. Moreover, data retention characteristics and recording quality can be improved.

24 Claims, 5 Drawing Sheets

METHOD OF CONTROLLING SERVO IN OPTICAL DISC DEVICE AND SERVO CONTROL DEVICE USING THE SAME

CROSS-REFERENCE TO RELATED PATENT APPLICATION

This application claims the benefit of Korean Patent Application No. 10-2007-0089951, filed on Sep. 5, 2007, in the Korean Intellectual Property Office, the disclosure of which is incorporated herein in its entirety by reference.

BACKGROUND OF THE INVENTION

1. Technical Field

The present disclosure relates to an optical disc and, more particularly, to a method of controlling a servo in an optical disc device and a servo control device using the same method.

2. Discussion of Related Art

Examples of optical disc devices include compact disc players, laser disc players, and compact disc graphic players. Such optical disc devices are used to reproduce images and/or sounds recorded on an optical disc using a display screen and/or a speaker.

The optical disc devices use light to write and read data to and from an optical disc. For such operations, an optical focus should be accurately placed on a signal surface of the optical disc. Most conventional optical disc devices use servo control devices for achieving accurate focusing. Such a servo control device performs a focus servo operation and a tracking servo operation. In the focus servo operation, an object lens of an optical pickup is moved perpendicularly to an optical disc surface for optical focusing. In the tracking servo operation, the object lens is moved in parallel to the optical disc for optical tracking. For example, in the focus servo operation, focus error signals detected while the object lens is moved perpendicularly to the optical disc can be fed back to minimize focus errors. In the tracking servo operation, tracking error signals detected while the object lens is moved in parallel to the optical disc can be fed back to minimize tracking errors.

According to recently developed technology, a predetermined image can be printed on a label surface of an optical disc for recording desired data. For this, an optical disc device may use a laser diode to write data to the label surface of the optical disc. If the optical disc device is servo-controlled using fed-back focus error signals, however, because a laser beam is accurately focused on the label surface of the optical disc, an excessive thermal concentration can be caused, and thus recorded data can be poorly retained. Moreover, due to the accurate focusing, a recording width of the optical disc can be narrow. In this case, recording time increases.

To address these problems, the distance between an optical disc and an object lens of an optical disc device can be increased. If the optical disc device is servo-controlled using fed-back focus error signals, however, the increase of the distance between the optical disc and the object lens is limited due to the characteristics of the focus error signals. Therefore, what is needed is a method of servo-controlling an optical disc device while allowing an object lens of the optical disc device to move within an increased range.

SUMMARY OF THE INVENTION

Exemplary embodiments of the present invention provide a servo control device capable of adjusting the distance between an object lens and an optical disc within an increased range without using a conventional focus error signal.

Exemplary embodiments of the present invention also provide a method of controlling a servo using the servo control device.

BRIEF DESCRIPTION OF THE DRAWINGS

Exemplary embodiments of the present invention will be understood in more detail from the following descriptions taken in conjunction with the attached drawings, in which.

DETAILED DESCRIPTION OF EXEMPLARY EMBODIMENTS

Figure 1:
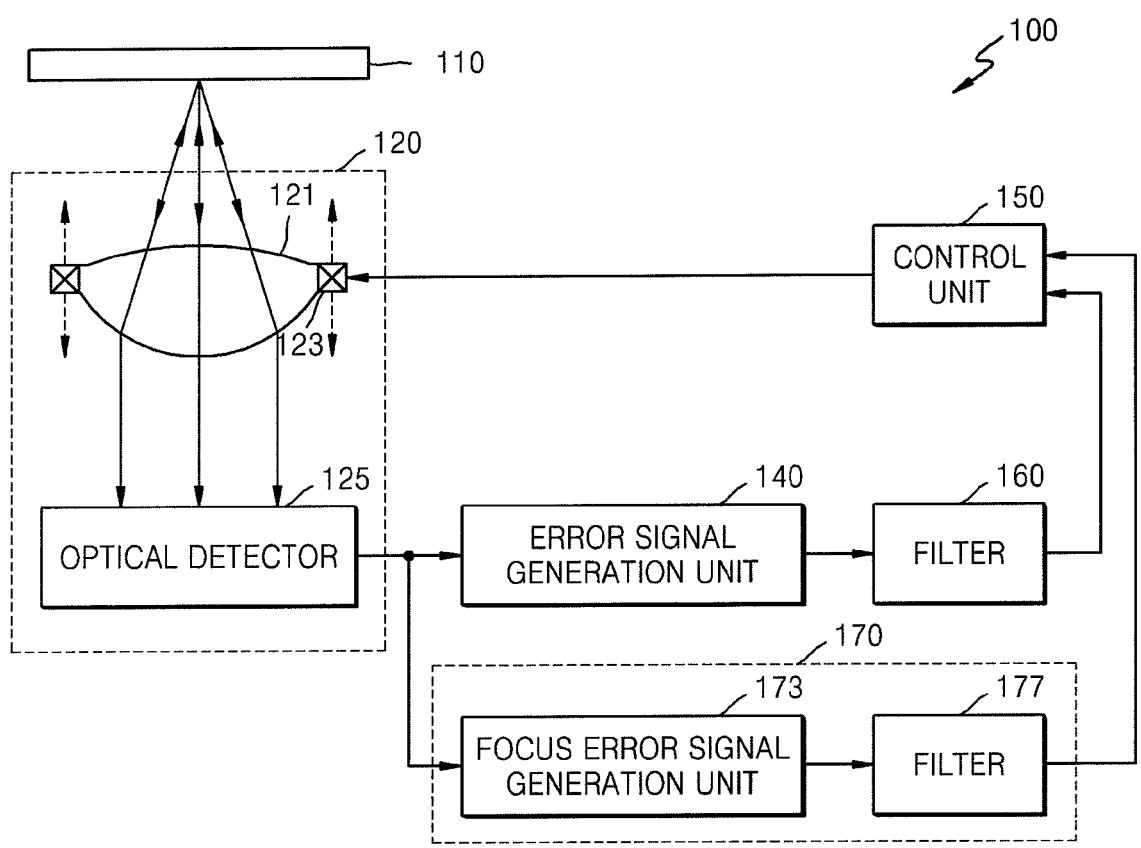
FIG. 1 is a block diagram illustrating a servo control device according to an exemplary embodiment of the present invention.

The attached drawings for illustrating exemplary embodiments of the present invention are referred to in order to gain a sufficient understanding of the present invention, the merits thereof, and the objectives accomplished by the implementation of the present invention.

Hereinafter, the present invention will be described in detail by explaining exemplary embodiments of the invention with reference to the attached drawings. Like reference numerals in the drawings denote like elements.

FIG. 1 is a block diagram illustrating a servo control device 100 according to an exemplary embodiment of the present invention.

Referring to FIG. 1, the servo control device 100 can be used to control a servo for printing on a label surface of an optical disc 110. For this, the servo control device 100 can include an optical pickup unit 120, an error signal generation unit 140, and a control unit 150.

The optical pickup unit 120 outputs a plurality of signals corresponding to the position of an object lens 121 using light reflected from the label surface of the optical disc 110. The optical pickup unit 120 can include a laser diode (not shown), a beam splitter (not shown), the object lens 121, an actuator 123, and an optical detector 125. For example, light emitted from the leaser diode is split by the beam splitter, and the object lens 121 collects the split light onto a spot. The actuator 123 is used to move the object lens 121 for placing the spot at a desired position on the optical disc 110. As shown in FIG. 1, the optical detector 125 detects light reflected from the surface of the optical disc 110. The optical detector 125 can include a division plate. Signals output from the optical detector 125 can include a plurality of main beam signals and a plurality of side beam signals. For example, when the division plate of the optical detector 125 is a four-division plate, which has four divisions A, B, C and D in a clockwise direction, signals VA, VB, VC, and VD output from the four divisions A, B, C, and D are the main beam signals.

The error signal generation unit 140 selects one of the signals output from the optical detector 125 and outputs the selected signal. Alternatively, the error signal generation unit 140 selects at least two of the signals output from the optical detector 125 and outputs a combined signal of the selected at least two signals. When the optical detector 125 outputs main beam signals and side beam signals, the error signal generation unit 140 can select one or at least two of the main beam signals and output the selected main beam signal or a combined signal of the selected at least two main beam signals. Hereinafter, a signal output from the error signal generation unit 140 will be referred to as an error signal.

For example, when the division plate of the optical detector 125 is a four-division plate as described above, the error signal may be one of the signals VA, VB, VC, and VD output from the optical detector 125. Alternatively, the error signal can be a combined signal of two, three, or all of the signals VA, VB, VC, and VD. For example, the error signal can be a combined signal VA+VB, a combined signal VA+VB+VC, or a combined signal VA+VB+VC+VD. In the example, the division plate of the optical detector 125 has four divisions, and the optical detector 125 outputs four main beam signals. The number of divisions of the division plate of the optical detector 125 can vary, however, and the optical detector 125 can output a different number of main beam signals. Although the number of divisions of the division plate of the optical detector 125 varies, the error signal generation unit 140 can generate an error signal in the same way as in the above-described example. This will be apparent to one of ordinary skill in the related art.

The control unit 150 adjusts the position of the object lens 121 according to the error signal output from the error signal generation unit 140. The control unit 150 can adjust the position of the object lens 121 by operating the actuator 123. After the control unit 150 adjusts the position of the object lens 121, the optical pickup unit 120 outputs signals corresponding to the adjusted position of the object lens 121, and the error signal generation unit 140 and the control unit 150 operate in the same way as described above. That is, the servo control device 100 of the exemplary embodiment can move the object lens 121 within an increased range, while using a feedback control method for printing on the label surface of the optical disc 110.

The servo control device 100 can further include a filter 160, an amplifier (not shown), and an offset compensation unit (not shown). In general, the filter 160 can be used to remove noise from an error signal output from the error signal generation unit 140. The amplifier can be used to amply the error signal. The offset compensation unit can be used to compensate for an offset of the error signal. The filter 160 can be a 1st or 2nd order low-pass filter.

The servo control device 100 can further include a direction sensor unit 170. The direction sensor unit 170 outputs a direction signal to the control unit 150 in response to signals output from the optical pickup unit 120 for positioning the object lens 121 in a control direction corresponding to the direction signal. The control unit 150 operates the actuator 123 when the control direction corresponding to the direction signal is equal to a direction in which the object lens 121 is intended to be adjusted. The control unit 150 does not operate the actuator 123 when the control direction corresponding to the direction signal is not equal to the direction in which the object lens 121 is intended to be adjusted. For example, when it is intended to move the object lens 121 toward the optical disc 110, the control unit 150 operates the actuator 123 to move the object lens 121 toward the optical disc 110 in response to an error signal output from the error signal generation unit 140 only when the control direction corresponding to the direction signal is toward the optical disc 110. On the other hand, although it is intended to move the object lens 121 toward the optical disc 110, the control direction corresponding to the direction signal can be opposite to the direction approaching the optical disc 110. In this case, the control unit 150 does not operate the actuator 123, and thus the object lens 121 does not move.

For example, the direction sensor unit 170 can output a focus error signal as a direction signal. In the exemplary embodiment shown in FIG. 1, the direction sensor unit 170 outputs a focus error signal as a direction signal. For this, the direction sensor unit 170 can include a focus error signal generation unit 173 and a filter 177. The present invention is not limited to the exemplary embodiment shown in FIG. 1. That is, it will be apparent to one of ordinary skill in the art that the direction sensor unit 170 can have any other structure as long as the direction sensor unit 170 can output a direction signal corresponding to a control direction. The focus error signal generation unit 173 outputs a focus error signal in response to signals output from the optical pickup unit 120. The filter 177 extracts only a DC voltage level component from the focus error signal. That is, the filter 177 transmits only a DC component of the focus error signal output from the focus error signal generation unit 173 and outputs the DC component as a direction signal. The control unit 150 determines a control direction from the DC voltage level of the direction signal.

Figure 2:
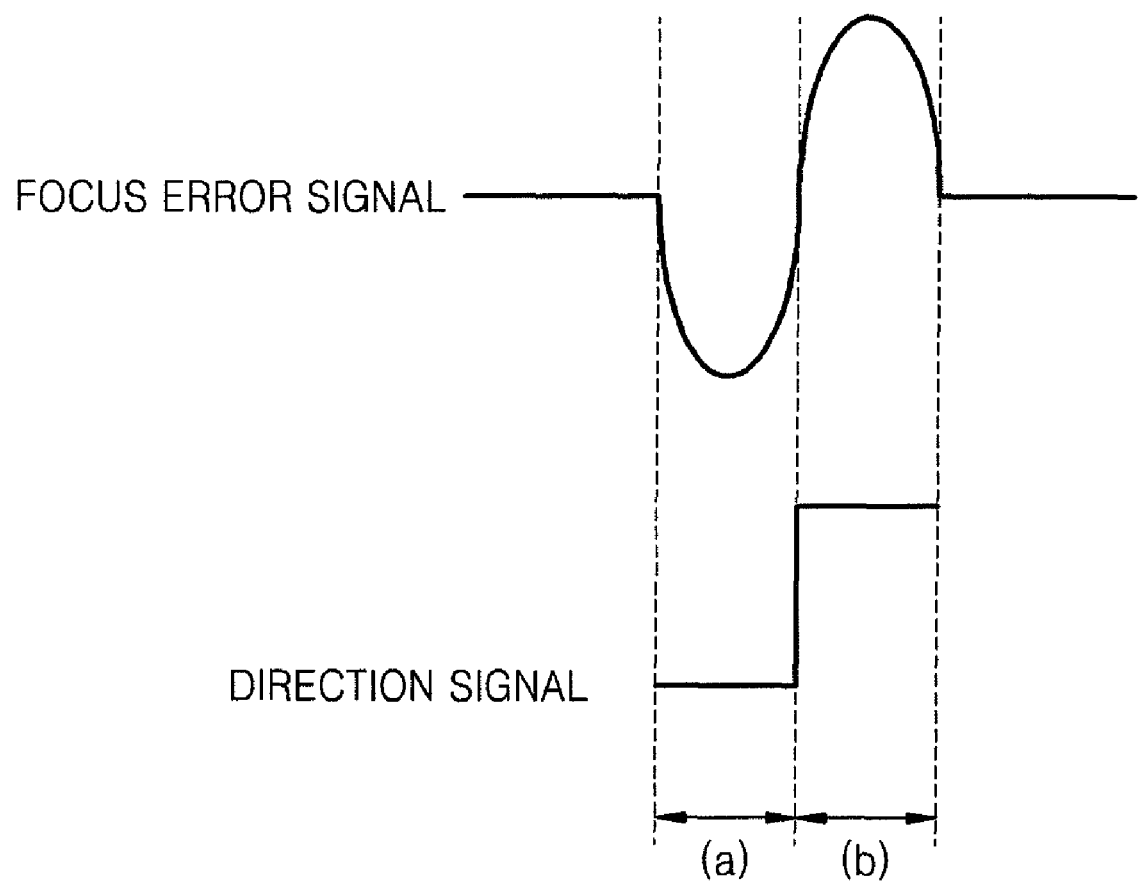
FIG. 2 is a graph illustrating a relationship between a focus error signal and a direction signal according to an exemplary embodiment of the present invention.

FIG. 2 is a graph illustrating a relationship between a focus error signal and a direction signal according to an exemplary embodiment of the present invention.

Referring to FIG. 2, after a focus error signal passes through the filter 177, the focus error signal is converted to a direction signal. In this case, a section (a) of the focus error signal is converted to a second logic state, and a section (b) of the focus error signal is converted to a first logic state. Hereinafter, it will be assumed that the first logic state is a high state and the second logic state is a low state. The logic state of the direction signal varies according the control direction of the object lens 121. For example, when the logic state of the direction signal is low, the control direction of the object lens 121 can be toward the object lens 121, and when the logic state of the direction signal is high, the control direction of the object lens 121 can be away from the object lens 121. In another example, when the logic state of the direction signal is low, the control direction of the object lens 121 can be away from the object lens 121, and when the logic state of the direction signal is high, the control direction of the object lens 121 can be toward the object lens 121. This will be apparent to one of ordinary skill in the related art.

Hereinafter, it is assumed that when the logic state (DC voltage level) of the direction signal is a first logic state, the direction signal corresponds to a direction approaching the object lens 121, and when the logic state of the direction signal is a second logic state, the direction signal corresponds to a direction away from the object lens 121. If it is intended to move the object lens 121 toward the optical disc 110 when a section (b) of a focus error signal is output from the focus error signal generation unit 173, that is, when the DC voltage level of a direction signal output from the filter 177 is in a first logic state, the control unit 150 operates the actuator 123 to move the object lens 121 toward the optical disc 110 in response to the direction signal output from the filter 177 and an error signal output from the error signal generation unit 140. If it is intended to move the object lens 121 toward the optical disc 110 when a section (a) of a focus error signal is output from the focus error signal generation unit 173, that is, when the DC voltage level of a direction signal output from the filter 177 is in a second logic state, the direction in which the object lens 121 is intended to be moved (a direction toward the object lens 121) is different from the direction corresponding to the direction signal (a direction away from the object lens 121). Therefore, the control unit 150 does not operate the actuator 123, and thus the object lens 121 does not move.

If it is intended to move the object lens 121 away from the optical disc 110 when a section (a) of a focus error signal is output from the focus error signal generation unit 173, that is, when the DC voltage level of a direction signal output from the filter 177 is in a second logic state, the control unit 150 operates the actuator 123 to move the object lens 121 away from the optical disc 110 in response to the direction signal output from the filter 177 and an error signal output from the error signal generation unit 140. If it is intended to move the object lens 121 away from the optical disc 110 when a section (b) of a focus error signal is output from the focus error signal generation unit 173, that is, when the DC voltage level of a direction signal output from the filter 177 is in a first logic state, the direction in which the object lens 121 is intended to be moved (a direction away from the object lens 121) is different from the direction corresponding to the direction signal (a direction toward the object lens 121). Therefore, the control unit 150 does not operate the actuator 123, and thus the object lens 121 does not move.

That is, the control unit 150 operates the actuator 123 to move the object lens 121 by a distance corresponding to an error signal output from the error signal generation unit 140 only when a direction corresponding to a direction signal output from the direction sensor unit 170 is equal to a direction in which the object lens 121 is intended to be moved. In other words, the direction signal is used to determine whether the direction in which the object lens 121 is intended to be moved is correct, and the error signal is used to determine the amount of movement of the object lens 121.

Figure 3:
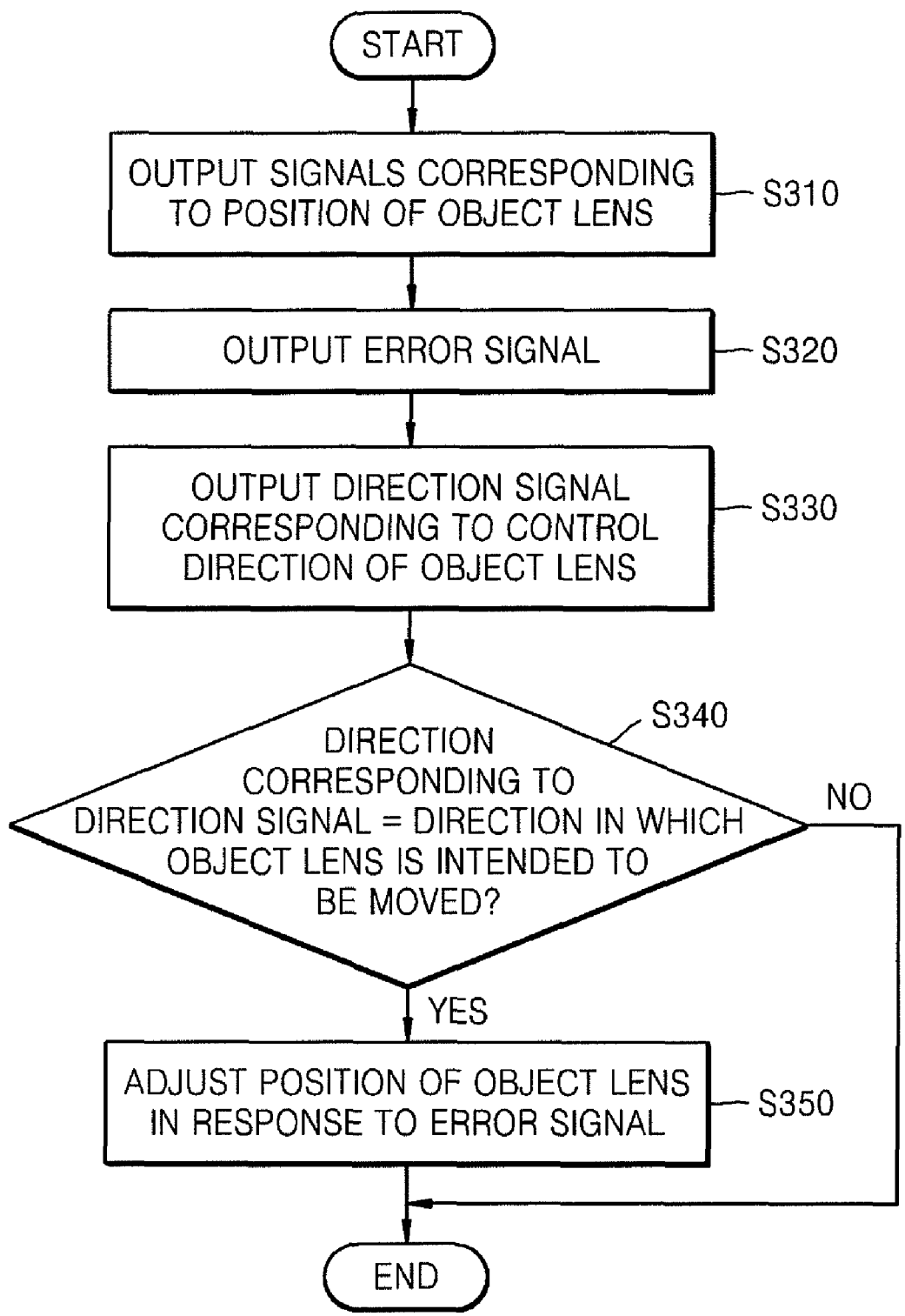
FIG. 3 is a flowchart illustrating a method of controlling a servo using the servo control device of FIG. 1, according to an exemplary embodiment of the present invention.

FIG. 3 is a flowchart illustrating a method of controlling a servo using the servo control device of FIG. 1, according to an exemplary embodiment of the present invention;

Referring to FIGS. 1 and 3, in operation S310, the optical pickup unit 120 outputs a plurality of signals corresponding to the position of the object lens 121. In operation S320, the error signal generation unit 140 outputs an error signal in response to the plurality of signals of the optical pickup unit 120. As explained above, the error signal can be one of the plurality of signals or a combined signal of at least two of the plurality of signals. In operation S330, the direction sensor unit 170 outputs a direction signal corresponding to a control direction of the object lens 121 in response to the plurality of signals output from the optical pickup unit 120. In operation S340, the control unit 150 determines whether the control direction corresponding to the direction signal is equal to a direction in which the object lens 121 is intended to be moved. If the control direction corresponding to the direction signal is equal to the direction in which the object lens 121 is intended to be moved, the control unit 150 operates the actuator 123 in response to the error signal to adjust the position of the object lens 121 in operation S350. If the control direction corresponding to the direction signal is not equal to the direction in which the object lens 121 is intended to be moved, the control unit 150 does not operate the actuator 123, and thus the object lens 121 is not moved.

In the embodiment of FIG. 3, the error signal is output before the direction signal is output. The error signal and the direction signal can be simultaneously output, however, or the error signal can be output after the direction signal is output to determine whether the direction in which the object lens 121 is intended to be moved is correct. This will be apparent to one of ordinary skill in the related art.

Figure 4:
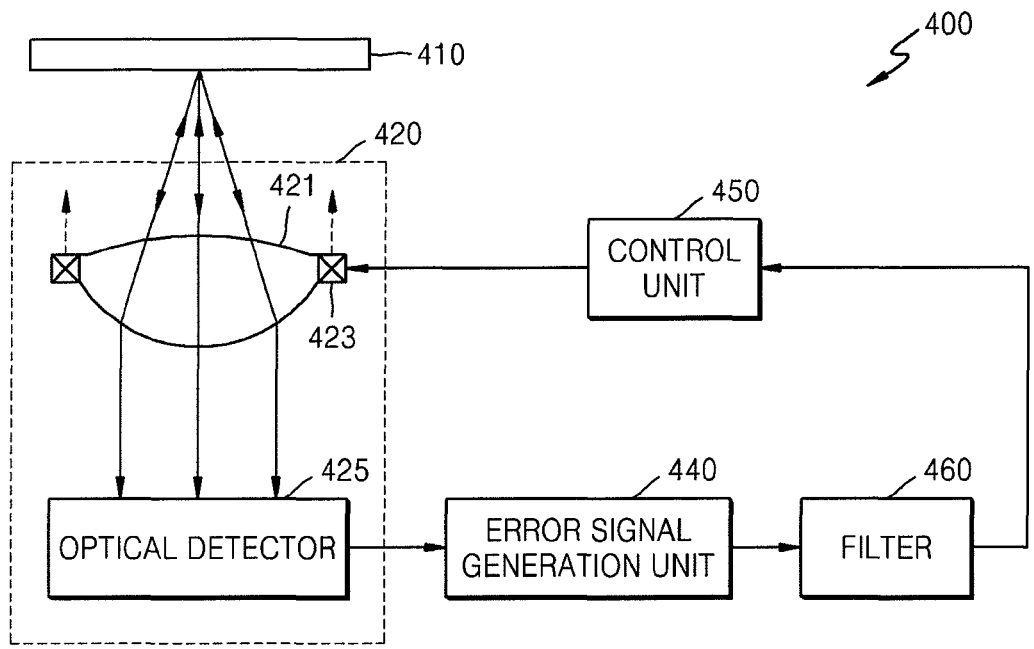
FIG. 4 is a block diagram illustrating a servo control device according to an exemplary embodiment of the present invention.

FIG. 4 is a block diagram illustrating a servo control device 400 according to an exemplary embodiment of the present invention.

Referring to FIG. 4, the servo control device 400 can be used to control a servo for printing on a label surface of an optical disc 410. For this operation, the servo control device 400 can include an optical pickup unit 420, an error signal generation unit 440, and a control unit 450.

The optical pickup unit 420 outputs a plurality of signals corresponding to the position of an object lens 421 using light reflected from the label surface of the optical disc 410. That is, the optical pickup unit 420 operates similarly to the optical pickup unit 120 of FIG. 1. Thus, a detailed description of the optical pickup unit 420 will be omitted. The error signal generation unit 440 selects one of the signals output from the optical pickup unit 420 and outputs the selected signal as an error signal. Alternatively, the error signal generation unit 440 selects at least two of the signals output from the optical pickup unit 420 and outputs a combined signal of the selected at least two signals as an error signal. That is, the error signal generation unit 440 operates similarly to the error signal generation unit 140 of FIG. 1. Thus, a detailed description of the error signal generation unit 440 will be omitted.

The control unit 450 adjusts the position of the object lens 421 in one direction according to an error signal output from the error signal generation unit 440. Unlike the control unit 150 of FIG. 1, the control unit 450 adjusts the position of the object lens 421 only in one direction. For example, the control unit 450 can adjust the position of the object lens 421 only in a direction approaching the optical disc 410 by moving the object lens 421 toward the optical disc 410 using an actuator 423 in response to an error signal output from the error signal generation unit 440. In another example, the control unit 450 can adjust the position of the object lens 421 only in a direction away from the optical disc 410 by moving the object lens 421 away from the optical disc 410 using the actuator 423 in response to an error signal output from the error signal generation unit 440. That is, in the embodiment of FIG. 4, because the object lens 421 is unidirectionally moved, it is unnecessary for the servo control device 400 to determine whether the direction of the object lens 421 is correct, and thus the servo control device 400 does not include an additional element such as the direction sensor unit 170 shown in FIG. 1.

Figure 5:
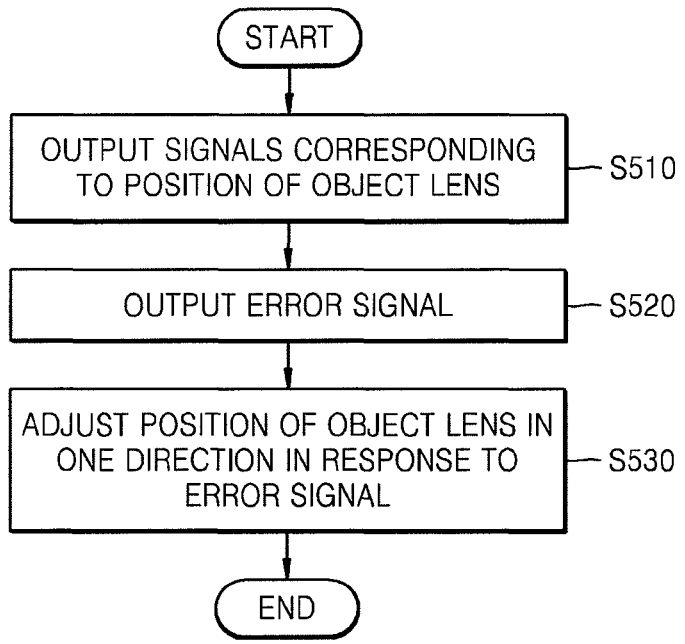
FIG. 5 a flowchart illustrating a method of controlling a servo using the servo control device of FIG. 4, according to an exemplary embodiment of the present invention.

FIG. 5 is a flowchart illustrating a method of controlling a servo using the servo control device of FIG. 4, according to an exemplary embodiment of the present invention.

Referring to FIGS. 4 and 5, in operation S510, the optical pickup unit 420 outputs a plurality of signals corresponding to the position of the object lens 421. In operation S520, the error signal generation unit 440 outputs an error signal in response to the plurality of signals of the optical pickup unit 420. As explained above, the error signal can be one of the plurality of signals or a combined signal of at least two of the plurality of signals. In operation S530, the control unit 450 adjusts the position of the object lens 421 only in one direction in response to the error signal. For example, the control unit 450 can adjust the position of the object lens 421 only in a direction approaching the optical disc 410 by moving the object lens 421 toward the optical disc 410 using the actuator 423 in response to an error signal output from the error signal generation unit 440. In another example, the control unit 450 can adjust the position of the object lens 421 only in a direction away from the optical disc 410 by moving the object lens 421 away from the optical disc 410 using the actuator 423 in response to an error signal output from the error signal generation unit 440.

Figure 6A:
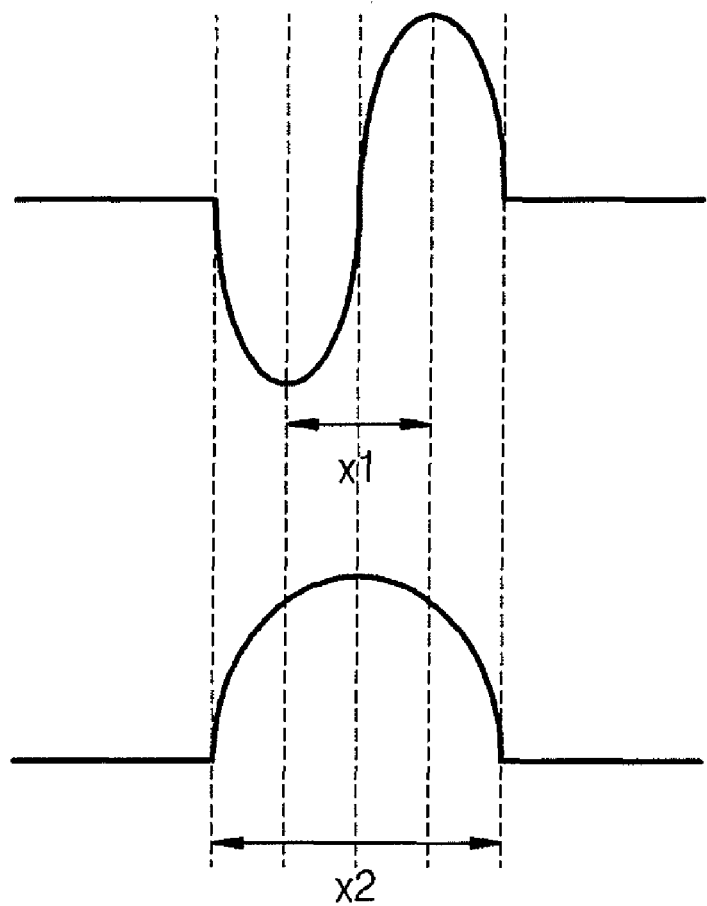
FIGS. 6A and 6B are graphs for explaining a moving range of an object lens of an exemplary embodiment of the present invention in relation to a moving range of a conventional object lens.
Figure 6B:
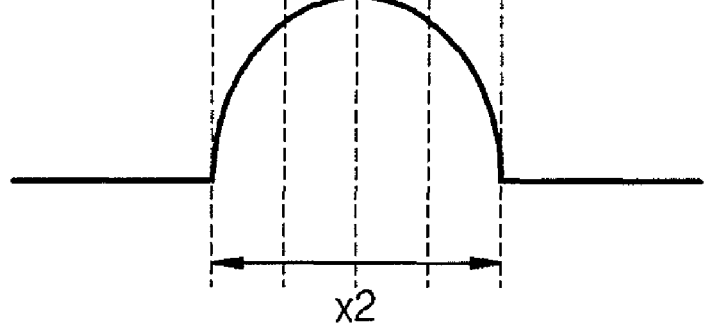

FIGS. 6A and 6B are graphs for explaining a moving range of an object lens of an exemplary embodiment of the present invention in relation to a moving range of a conventional object lens.

Referring to FIG. 6A, the waveform denotes a focus error signal obtained using an astigmatic method, and in FIG. 6B the waveform denotes an error signal. For example, when a four-division plate is used as described above, the focus error signal obtained using the astigmatic method can be expressed by (VA+VC)−(VB+VD). The astigmatic method is well known to one of ordinary skill in the related art. Thus, a detailed description of the astigmatic method will be omitted. In this case, the focus error signal shown in FIG. 6A can be expressed by VA+VB+VC+VD.

In a conventional focus servo control method, the position of an object lens is adjusted using a focus error signal such as the focus error signal shown in FIG. 6A. In this case, the focus servo control is performed within a range x1. According to an exemplary embodiment of the present invention, however, an error signal obtained by selecting one of the signals output from the optical pickup unit 120 or 420 or combining at least two of the signals output from the optical pickup unit 120 or 420 is used instead of the focus error signal obtained using the astigmatic method, so that the focus servo control can be performed within an increased range. That is, in the embodiment of FIG. 1, the object lens 121 can be moved toward and away from the optical disc 110. That is, the focus servo control can be performed within an increased range x2 shown in FIG. 6B. In addition, in the embodiment of FIG. 4, the object lens 421 can be moved in one direction within half the range x2. That is, if the object lens 421 is moved in both directions, the range of the focus servo control can be x2. Therefore, according to exemplary embodiments of the present invention, an object lens can be controlled within an increased range as compared with a conventional focus servo control method.

As described above, according to the exemplary method of controlling a servo in an optical disc device and a servo control device using the method, the position of an object lens can be adjusted with an increased range. Therefore, according to exemplary embodiments of the present invention, when data are recorded on an optical disc using the optical disc device, the size of a spot of a beam condensed by the object lens can be adjusted within an increased range, and data recording time can be reduced. In addition, data retention characteristics and recording quality of the optical disc can be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A servo control device for controlling a servo for printing on a label surface of an optical disc, the servo control device comprising:

an optical pickup unit outputting a plurality of signals corresponding to a position of an object lens in response to light reflected from the label surface of the optical disc;

an error signal generation unit outputting a signal by selecting one of the plurality of signals output from the optical pickup unit or combining at least two of the plurality of signals output from the optical pickup unit;

a control unit adjusting the position of the object lens in response to the signal output from the error signal generation unit; and a direction sensor unit outputting a direction signal corresponding to a control direction of the object lens to the control unit in response to the plurality of signals output from the optical pickup unit, wherein the control unit adjusts the position of the object lens when the control direction corresponding to the direction signal is equal to a direction in which the object lens is intended to be adjusted.

2. The servo control device of claim 1, wherein the direction sensor unit comprises:

a focus error signal generation unit outputting a focus error signal in response to the plurality of signals output from the optical pickup unit; and a filter extracting a DC component from the focus error signal and outputting the DC component as the direction signal.

3. The servo control device of claim 2, wherein the filter is a low-pass filter.

4. The servo control device of claim 2, wherein when the direction signal is in a first logic state, the direction signal corresponds to a direction approaching the optical disc, and when the direction signal is in a second logic state, the direction signal corresponds to a direction away from the optical disc.

5. The servo control device of claim 4, wherein when the direction signal is in the first logic state and the object lens is intended to be moved toward the optical disc, the control unit adjusts the position of the object lens toward the optical disc, and when the direction signal is in the second logic state and the object lens is intended to be moved toward the optical disc, the control unit does not adjust the position of the object lens.

6. The servo control device of claim 4, wherein when the direction signal is in the second logic state and the object lens is intended to be moved away from the optical disc, the control unit adjusts the position of the object lens away from the optical disc, and when the direction signal is in the first logic state and the object lens is intended to be moved away from the optical disc, the control unit does not adjust the position of the object lens.

7. The servo control device of claim 1, wherein the optical pickup unit outputs a plurality of main beam signals and a plurality of side beam signals corresponding to the position of the object lens in response to light reflected from the label surface of the optical disc; and the error signal generation unit outputs a signal by selecting one of the plurality of main beam signals or combining at least two of the plurality of main beam signals.

8. The servo control device of claim 1, further comprising a filter removing noise of the signal output from the error signal generation unit and transmitting the noise-removed signal to the control unit.

9. The servo control device of claim 8, wherein the filter is a low-pass filter.

10. The servo control device of claim 1, wherein the control unit operates an actuator to adjust the position of the object lens in response to the signal output from the error signal generation unit.

11. A method of controlling a servo for printing on a label surface of an optical disc, the method comprising:
    outputting a plurality of signals corresponding to a position of an object lens in response to light reflected from the label surface of the optical disc;
    outputting an error signal by selecting one of the plurality of signals or combining at least two of the plurality of signals;
    adjusting the position of the object lens in response to the error signal; and
    outputting a direction signal corresponding to a control direction of the object lens in response to the plurality of signals,
    wherein adjusting the position of the object lens comprises adjusting the position of the object lens when the control direction corresponding to the direction signal is equal to a direction in which the object lens is intended to be adjusted.

12. The method of claim 11, wherein outputting the direction signal comprises:
    outputting a focus error signal in response to the plurality of signals; and
    extracting a DC component from the focus error signal and outputting the DC component as the direction signal.

13. The method of claim 12, wherein when the direction signal is in a first logic state, the direction signal corresponds to a direction approaching the optical disc, and when the direction signal is in a second logic state, the direction signal corresponds to a direction away from the optical disc.

14. The method of claim 13, wherein adjusting the position of the object lens comprises:
    adjusting the position of the object lens toward the optical disc when the direction signal is in the first logic state and the object lens is intended to be moved toward the optical disc; and
    maintaining the position of the object lens when the direction signal is in the second logic state and the object lens is intended to be moved toward the optical disc.

15. The method of claim 13, wherein adjusting the position of the object lens comprises:
    adjusting the position of the object lens away from the optical disc when the direction signal is in the second logic state and the object lens is intended to be moved away from the optical disc; and
    maintaining the position of the object lens when the direction signal is in the first logic state and the object lens is intended to be moved away from the optical disc.

16. The method of claim 11, wherein outputting the plurality of signals comprises outputting a plurality of main beam signals and a plurality of side beam signals corresponding to the position of the object lens in response to light reflected from the label surface of the optical disc; and
    the outputting the error signal comprises outputting an error signal by selecting one of the plurality of main beam signals or combining at least two of the plurality of main beam signals.

17. The method of claim 11, further comprising removing noise from the error signal.

18. The method of claim 11, wherein adjusting the position of the object lens comprises operating an actuator to adjust the position of the object lens in response to the error signal.

19. A servo control device for controlling a servo for printing on a label surface of an optical disc, the servo control device comprising:
    an optical pickup unit outputting a plurality of signals corresponding to a position of an object lens in response to light reflected from the label surface of the optical disc;
    an error signal generation unit outputting a signal by selecting one of the plurality of signals output from the optical pickup unit or combining at least two of the plurality of signals output from the optical pickup unit;
    a control unit adjusting the position of the object lens in response to the signal output from the error signal generation unit; and
    a direction sensor unit outputting a direction signal corresponding to a control direction of the object lens to the control unit in response to the plurality of signals output from the optical pickup unit,
    wherein the direction sensor unit comprises a focus error signal generation unit outputting a focus error signal in response to the plurality of signals output from the optical pickup unit, and a filter extracting a DC component from the focus error signal and outputting the DC component as the direction signal,
    wherein when the direction signal is in a first logic state, the direction signal corresponds to a direction approaching the optical disc, and when the direction signal is in a second logic state, the direction signal corresponds to a direction away from the optical disc.

20. The servo control device of claim 19, wherein when the direction signal is in the first logic state and the object lens is intended to be moved toward the optical disc, the control unit adjusts the position of the object lens toward the optical disc, and when the direction signal is in the second logic state and the object lens is intended to be moved toward the optical disc, the control unit does not adjust the position of the object lens.

21. The servo control device of claim 19, wherein when the direction signal is in the second logic state and the object lens is intended to be moved away from the optical disc, the control unit adjusts the position of the object lens away from the optical disc, and when the direction signal is in the first logic state and the object lens is intended to be moved away from the optical disc, the control unit does not adjust the position of the object lens.

22. A method of controlling a servo for printing on a label surface of an optical disc, the method comprising:
    outputting a plurality of signals corresponding to a position of an object lens in response to light reflected from the label surface of the optical disc;
    outputting an error signal by selecting one of the plurality of signals or combining at least two of the plurality of signals;
    adjusting the position of the object lens in response to the error signal; and
    outputting a direction signal corresponding to a control direction of the object lens in response to the plurality of signals,
    wherein outputting the direction signal comprises outputting a focus error signal in response to the plurality of signals, and extracting a DC component from the focus error signal and outputting the DC component as the direction signal,
    wherein when the direction signal is in a first logic state, the direction signal corresponds to a direction approaching the optical disc, and when the direction signal is in a second logic state, the direction signal corresponds to a direction away from the optical disc.

23. The method of claim 22, wherein adjusting the position of the object lens comprises:
- adjusting the position of the object lens toward the optical disc when the direction signal is in the first logic state and the object lens is intended to be moved toward the optical disc; and
- maintaining the position of the object lens when the direction signal is in the second logic state and the object lens is intended to be moved toward the optical disc.

24. The method of claim 22, wherein adjusting the position of the object lens comprises:
- adjusting the position of the object lens away from the optical disc when the direction signal is in the second logic state and the object lens is intended to be moved away from the optical disc; and
- maintaining the position of the object lens when the direction signal is in the first logic state and the object lens is intended to be moved away from the optical disc.

* * * * *